(12) United States Patent
Reierson et al.

(10) Patent No.: US 9,443,079 B2
(45) Date of Patent: *Sep. 13, 2016

(54) APPLICATION EXECUTION IN A RESTRICTED APPLICATION EXECUTION ENVIRONMENT

(71) Applicant: Microsoft Technology Licensing, LLC, Redmond, WA (US)

(72) Inventors: Kristofer Hellick Reierson, Acton, MA (US); Angela Mele Anderson, Boston, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 57 days.

This patent is subject to a terminal disclaimer.

(21) Appl. No.: 14/275,105

(22) Filed: May 12, 2014

(65) Prior Publication Data

US 2014/0250494 A1 Sep. 4, 2014

Related U.S. Application Data

(63) Continuation of application No. 12/978,664, filed on Dec. 27, 2010, now Pat. No. 8,789,138.

(51) Int. Cl.
*G06F 3/00* (2006.01)
*G06F 17/00* (2006.01)
*G06F 21/53* (2013.01)
*G06F 9/46* (2006.01)
*G06F 9/54* (2006.01)

(52) U.S. Cl.
CPC ............... *G06F 21/53* (2013.01); *G06F 9/468* (2013.01); *G06F 9/541* (2013.01); *G06F 9/545* (2013.01); *G06F 2209/542* (2013.01); *G06F 2221/2141* (2013.01)

(58) Field of Classification Search
None
See application file for complete search history.

(56) References Cited

U.S. PATENT DOCUMENTS 5,974,549 A 10/1999 Golan
6,721,809 B1 4/2004 Roy et al.
(Continued)

FOREIGN PATENT DOCUMENTS

CN 101458630 A 6/2009
TW 200915126 4/2009
TW 201004246 1/2010

OTHER PUBLICATIONS

Translated Copy of the Chinese Office Action mailed Nov. 15, 2014 for Chinese patent application No. 201110442192.8, a counterpart foreign application of U.S. Appl. No. 12/978,664, 6 pages.

(Continued)

*Primary Examiner* — Adam Lee
(74) *Attorney, Agent, or Firm* — Nicholas Chen; Kate Drakos; Micky Minhas

(57) ABSTRACT

Application programming interface (API) calls made by an application are intercepted at runtime. A determination is made as to whether each intercepted API call is allowed or blocked by a restricted application execution environment. Each API call that is blocked by the restricted application execution environment is modified so that the API call is allowable such as, for instance, modifying the API call to execute against a shadow resource. Remediation code might also be executed at runtime to reformat the API call so that it is allowed to execute in the restricted application execution environment.

20 Claims, 6 Drawing Sheets

(56) References Cited

U.S. PATENT DOCUMENTS

| | | | |
|---|---|---|---|
| 6,745,385 B1 | 6/2004 | Lupu et al. | |
| 6,763,370 B1 | 7/2004 | Schmeidler et al. | |
| 6,938,096 B1 | 8/2005 | Greschler et al. | |
| 7,017,188 B1 | 3/2006 | Schmeidler et al. | |
| 7,028,305 B2 | 4/2006 | Schaefer | |
| 7,032,213 B1 | 4/2006 | Lupu et al. | |
| 7,055,146 B1 | 5/2006 | Durr et al. | |
| 7,200,632 B1 | 4/2007 | Greschler et al. | |
| 7,225,264 B2 | 5/2007 | Croman et al. | |
| 7,398,532 B1* | 7/2008 | Barber | G06F 21/53 718/100 |
| 7,406,676 B2 | 7/2008 | Khalid et al. | |
| 7,426,661 B2 | 9/2008 | Schaefer | |
| 7,451,451 B2 | 11/2008 | Schaefer | |
| 7,590,743 B2 | 9/2009 | Willis | |
| 7,690,039 B2 | 3/2010 | Schmeidler et al. | |
| 7,707,641 B2 | 4/2010 | Schmeidler et al. | |
| 7,730,169 B1 | 6/2010 | Greschler et al. | |
| 7,765,307 B1 | 7/2010 | Kritov et al. | |
| 7,797,372 B2 | 9/2010 | Greschler et al. | |
| 7,941,813 B1 | 5/2011 | Protassov et al. | |
| 8,224,796 B1 | 7/2012 | Shinde et al. | |
| 8,407,787 B1 | 3/2013 | Lou et al. | |
| 8,438,640 B1 | 5/2013 | Vaish et al. | |
| 8,510,838 B1 | 8/2013 | Sun et al. | |
| 8,775,333 B1* | 7/2014 | Zahn | G06F 21/552 706/12 |
| 8,805,995 B1* | 8/2014 | Oliver | G06F 21/552 709/224 |
| 2002/0019887 A1 | 2/2002 | Moore | |
| 2004/0083465 A1 | 4/2004 | Zhang et al. | |
| 2004/0267778 A1 | 12/2004 | Rudolph et al. | |
| 2006/0075123 A1* | 4/2006 | Burr | H04L 29/12311 709/228 |
| 2006/0143688 A1 | 6/2006 | Futoransky et al. | |
| 2006/0195547 A1* | 8/2006 | Sundarrajan | H04L 69/163 709/217 |
| 2007/0016914 A1* | 1/2007 | Yeap | G06F 21/554 719/328 |
| 2007/0094496 A1 | 4/2007 | Burtscher | |
| 2007/0250928 A1* | 10/2007 | Boney | G06F 21/56 726/24 |
| 2008/0028469 A1* | 1/2008 | Repasi | G06F 21/577 726/24 |
| 2008/0040804 A1 | 2/2008 | Oliver et al. | |
| 2008/0066180 A1* | 3/2008 | Repasi | G06F 21/563 726/24 |
| 2008/0104085 A1 | 5/2008 | Papoutsakis et al. | |
| 2008/0141286 A1 | 6/2008 | Marinescu | |
| 2008/0172631 A1* | 7/2008 | Oliver | G06F 21/55 715/771 |
| 2009/0044205 A1 | 2/2009 | Yoshimura et al. | |
| 2009/0049550 A1* | 2/2009 | Shevchenko | G06F 21/56 726/23 |
| 2009/0126017 A1* | 5/2009 | Chahal | G06F 21/54 726/23 |
| 2009/0158241 A1 | 6/2009 | Nandane et al. | |
| 2010/0011351 A1 | 1/2010 | Tsvi et al. | |
| 2010/0011447 A1 | 1/2010 | Jothimani | |
| 2010/0017811 A1 | 1/2010 | Sng | |
| 2010/0031361 A1 | 2/2010 | Shukla | |
| 2010/0064299 A1* | 3/2010 | Kacin | G06F 9/45537 719/317 |
| 2010/0146250 A1 | 6/2010 | Bergerson et al. | |
| 2010/0175104 A1* | 7/2010 | Khalid | G06F 9/545 726/1 |
| 2011/0029772 A1 | 2/2011 | Fanton et al. | |
| 2011/0145926 A1 | 6/2011 | Dalcher et al. | |
| 2012/0117644 A1 | 5/2012 | Soeder | |
| 2014/0304771 A1 | 10/2014 | Reierson et al. | |

OTHER PUBLICATIONS

International Search report dated Jul. 30, 2012 in International Application No. PCT/US11/066769.

"A Closer Look at Windows Vista, Part I: Security Changes", Published on: Jan. 15, 2010, Available at: http://zone.ni.com/devzone/cda/tut/p/id/5538, 5 Pages.

Lockwood, Damon, "Application Virtualization and Application Instrumentation", Published on: Jan. 14, 2010, Available at: http://www.itbusinessnet.com/articles/viewarticle.jsp?id=956161, 3 Pages.

Smith, Russell, "Solving Least Privilege Problems with the Application Compatibility Toolkit", Published on: Jul. 2010, Available at https://www.packtpub.com/article/solving-least-privilege-problems-application-compatibility-toolkit, 15 Pages.

"WoW64", Published on: Oct. 8, 2010, Available at: http://en.wikipedia.org/wiki/WOW64, 2 Pages.

"Microsoft Windows Enterprise: Improving Virtual PCs with Med-V", Published on: Oct. 8, 2010, Available at http://www.microsoft.com/windows/enterprise/products/mdop/med-v.aspx, 2 Pages.

U.S. Official Action dated Dec. 28, 2012 in U.S. Appl. No. 12/978,664.

U.S. Official Action dated Jun. 21, 2013 in U.S. Appl. No. 12/978,664.

U.S. Notice of Allowance dated Mar. 11, 2014 in U.S. Appl. No. 12/978,664.

Extended European Search Report from EP Application No. 11853115.1 dated Mar. 27, 2015; 7 pages.

Provos, Neils; "Improved Host Security With System Policies"; Center for Information Technology Integration, Univ. of Michigan; Proceedings of the 12th Usenix Security Symposium, Washington, D.C.; Aug. 40-8, 2003, pp. 16 —.

Office Action and Search Report dated Apr. 29, 2014 in Chinese Patent Application No. 201110442192.8.

Taiwanese Office Action mailed Sep. 11, 2015 for Taiwan patent application No. 100142078, a counterpart foreign application of U.S. Pat. No. 8,789,138.

Office action for U.S. Appl. No. 14/310,489, mailed on Dec. 15, 2015, Reierson et al., "Application Execution in a Restricted Application Execution Environment", 17 pages.

* cited by examiner

APPLICATION EXECUTION IN A RESTRICTED APPLICATION EXECUTION ENVIRONMENT

CROSS-REFERENCE TO RELATED APPLICATIONS

This application is a continuation of co-pending U.S. patent application Ser. No. 12/978,664 filed on Dec. 27, 2010, and entitled "Application Execution in a Restricted Application Execution Environment," which is expressly incorporated herein by reference in its entirety.

BACKGROUND

There is a greater need today for secure operating systems than ever before. One way newer computer operating systems provide greater security is by imposing significant restrictions on how application programs may execute. For instance, an operating system may not allow an application program programmed for use with an older version of the operating system to access certain operating system provided application programming interfaces ("APIs"). As a result, legacy applications (i.e. applications programmed for use with an older version of the operating system) may cease to function, or may function improperly, when executed on a newer version of an operating system.

In order to enable legacy application programs to function with a newer operating system that imposes more burdensome security restrictions, it may be necessary to modify the application program. Modification of a legacy application program might not always be possible, however, because the source code may be unavailable, the original developer of the application program may be unavailable, financial resources may be unavailable to finance the modification, or the underlying technology may be too difficult to understand. This may prove to be frustrating to an individual or an organization that desires to execute the legacy application on a newer operating system.

It is with respect to these and other considerations that the disclosure made herein is presented.

SUMMARY

Technologies are described herein for executing an application in a restricted application execution environment. As used herein, the term "restricted application execution environment" is utilized to refer to an environment for executing an application program that imposes security restrictions on the execution of application programs. For instance, an operating system that restricts access to legacy operating system provided APIs is a restricted application execution environment. The concepts and technologies disclosed herein permit legacy applications to access APIs provided by a restricted application execution environment that they might otherwise not be permitted to utilize.

According to one aspect presented herein, a learning mode is utilized to identify the API calls made by an application that are not allowed by a restricted application execution environment. To identify these API calls, the application is executed and the API calls made by the application are intercepted. For each intercepted API call, a determination is made as to whether the restricted application execution environment would allow the API call to be performed. In one embodiment, a security rules database is consulted to make this determination. The security rules database stores data indicating whether API calls are allowable by a restricted application execution environment.

For each API call that cannot be performed within the restricted application execution environment, data is stored in a database, referred to herein as a runtime remediation database, that identifies the API call. Additional state information regarding the API call might also be stored in the runtime remediation database, such as data identifying the caller of the API, a call stack, data indicating how the API was called, call parameters, and other data.

The contents of the runtime remediation database may be utilized at runtime to identify blocked API calls and to modify the API calls so that the restricted application execution environment will allow the calls. In particular, API calls made by the application at runtime are intercepted. For each intercepted API call, a determination is made as to whether the API call is allowed by the restricted application execution environment. The contents of the runtime remediation database may be utilized to identify calls that are not allowed.

Each API call that is blocked by the restricted application execution environment is modified so that the API call is allowable. For instance, in one example, an API call for accessing a secure resource, such as a registry or a file on a mass storage device, may be modified such that it is executed against a shadow resource. A shadow resource is a version of the secure resource that is accessible to the API within the restricted application execution environment. In another example, program code, referred to herein as remediation code, may be executed to reformat the API call so that it is allowed to execute in the restricted application execution environment. The modified or reformatted API call may then be executed in the restricted application execution environment.

This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
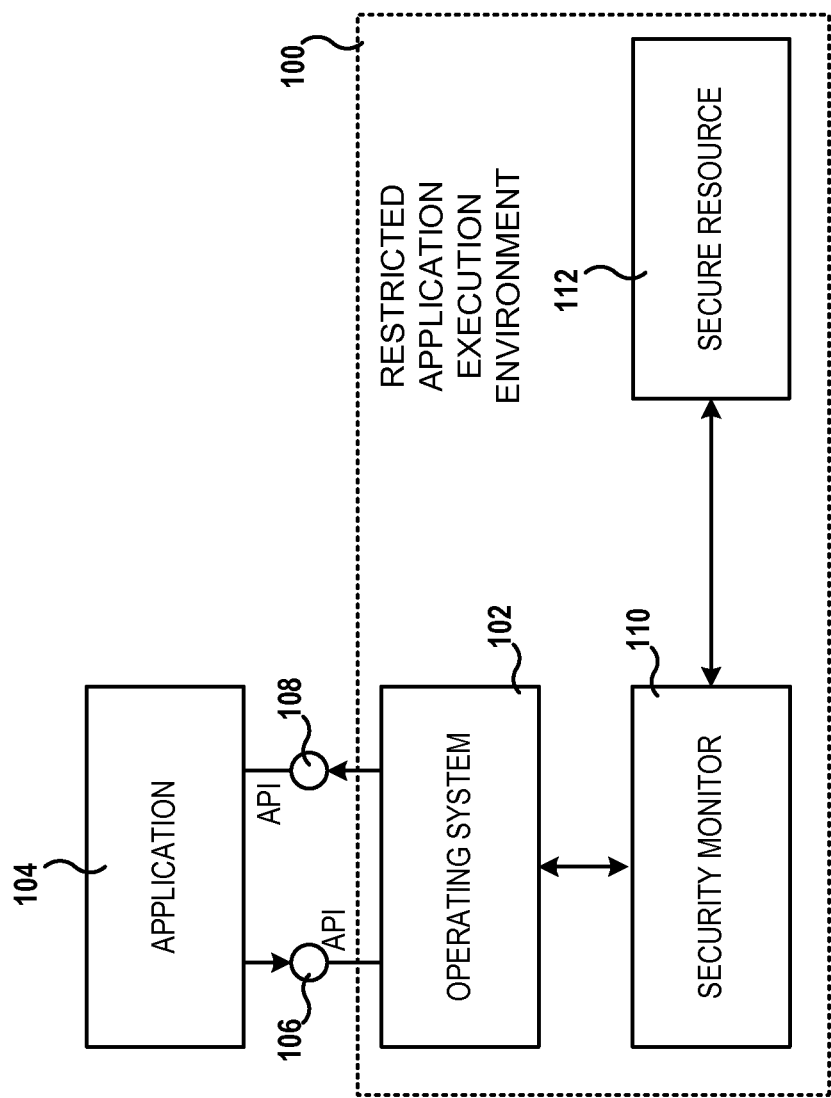
FIG. 1 is a software architecture diagram showing one illustrative operating environment for the embodiments disclosed herein.

The following detailed description is directed to technologies for executing an application in a restricted application execution environment. As discussed briefly above, API calls made by an application are intercepted at runtime. A determination is then made as to whether each intercepted API call is allowed by a restricted application execution environment. Each API call that is blocked by the restricted application execution environment is modified so that the API call is allowable such as, for instance, modifying the API call to execute against a shadow resource. Remediation code might also be executed at runtime to reformat the API call so that it is allowed to execute in the restricted application execution environment. Additional details regarding these and other features will be provided below.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for executing an application in a restricted application execution environment will be described.

FIG. 1 is a software and network architecture diagram showing one illustrative operating environment for the embodiments disclosed herein. In particular, the illustrative operating environment shown in FIG. 1 includes a restricted application execution environment 100. As discussed briefly above, a restricted application execution environment 100 is an environment for executing application programs that impose security restrictions on the execution of the application programs. For instance, in the restricted application execution environment 100 shown in FIG. 1, an operating system 102 exposes an API 106. When the application 104 calls the API 106, the operating system 102 consults a security monitor 110 to determine whether the call to the API 106 is allowed.

In response to receiving a request from the operating system 102, the security monitor 110 may perform various processes to determine whether the call to the API 106 by the application 104 is allowed. For instance, the application 104 may make a call to an API 106 for accessing a secure resource 112 that has been deprecated in a newer version of the operating system 102. The security monitor 110 may identify the call as being unallowable and cause the operating system 102 to deny the application 104 access to the API 106. The application 104 may expose a callback API 108 through which the operating system 102 may communicate this to the application 104.

If the security monitor 110 determines that the call to the API 106 is allowable, the security monitor 110 and the operating system 102 will allow the call to the API 106 to be performed. For instance, in the example described above, where the API 106 is for accessing a secure resource 112, the security monitor 110 will allow the application 104 to access the secure resource 112. It should be appreciated that a secure resource 112 may be a file, a named object or event, a user interface message pump, a kernel object, a registry, a network device, or another type of computing resource that is managed in a secure fashion.

It should also be appreciated that the security monitor 110 may deny access to an API 106 for reasons other than those described above. For instance, the security monitor 110 may determine that the application 104 has not been digitally signed in an appropriate manner, utilizes calls to hidden or unauthorized APIs, has not been programmed utilizing an authorized development environment, or for other reasons. As will be described in greater detail below, the embodiments presented herein provide functionality for allowing the application 104 to be executed within the restricted application execution environment 100 shown in FIG. 1 in a secure manner.

It should be further appreciated that the restricted application execution environment 100 shown in FIG. 1 may be provided by a standard desktop or laptop computer system, a server computer, a tablet computing device, a wireless telephone, or virtually any other type of computing device. It should also be appreciated that the restricted application execution environment 100 shown in FIG. 1 is merely illustrative and that the embodiments presented herein may be utilized with other types of environments that restrict the execution of application programs 104.

Figure 2:
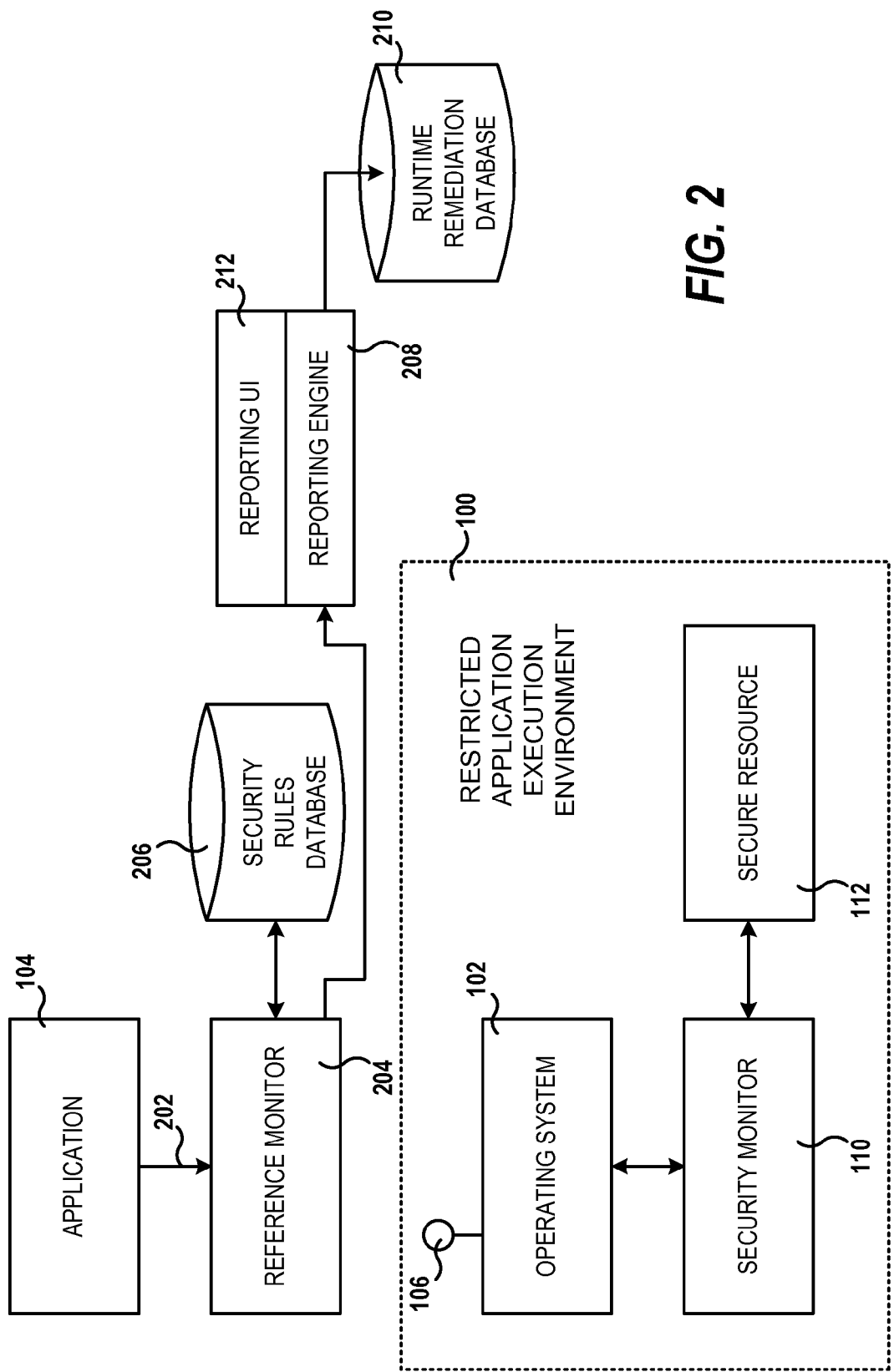
FIG. 2 is a software architecture diagram showing aspects of a learning mode of operation utilized in one embodiment disclosed herein to identify API calls that are blocked by a restricted application execution environment.

FIG. 2 is a software architecture diagram showing aspects of a learning mode of operation utilized in one embodiment disclosed herein to identify API calls that are not allowed in a restricted application execution environment 100. As shown in FIG. 2, the operating system 102 exposes an API 106 for use by application programs. As also discussed above with respect to FIG. 1, a security monitor 110 is utilized in conjunction with the operating system 102 that mediates access to a secure resource 112. As will be described in greater detail below, a learning mode of operation is illustrated in FIG. 2 for identifying API calls 202 made by the application 104 that are blocked by the operating system 102 and the security monitor 110. As will also be discussed below, once the API calls made by the application 104 have been identified, mechanisms may be utilized to modify or reconfigure the API calls so that they are allowed at runtime.

In the learning mode of operation shown in FIG. 2, the application program 104 is executed. A reference monitor 204 intercepts API calls 202 made by the application 104. The reference monitor 204 is configured to intercept the API calls 202 and, and in response thereto, to determine whether the API calls 202 are allowed to execute within the restricted application environment 100.

According to one implementation, the reference monitor 204 determines whether the API calls 202 are allowed to execute by consulting the security rules database 206. In one embodiment, the security rules database 206 includes data indicating whether the API calls are allowed to be executed within the restricted application execution environment 100. For instance, the security rules database 206 may include a list of secure resources 112 within the restricted application execution environment 100. If the reference monitor 204 determines that the application 104 has made an API call 202 to a secure resource 112, the API call 202 may be deemed to be unallowable by the restricted application execution environment 100.

If the reference monitor 204 identifies an API call 202 that will be blocked by the restricted application execution environment 100, the reference monitor 204 sends data regarding the API call 202 to the reporting engine 208. In response to receiving data from the reference monitor 204, the reporting engine 208 is configured to determine if the API call 202 is remediatable. That is, the reporting engine 208 is configured in one embodiment to determine if the API call 202 may be modified for execution within the restricted application execution environment 100.

If the reporting engine 208 determines that the API call 202 is not remediatable, the reporting engine 208 may provide an indication to a developer or author of the application 104. In this manner, the author of the application 104 may take steps to modify the application 104 so that the API call 202 is allowable within the restricted application execution environment 100.

If the reporting engine 208 determines that the API call 202 is remediatable, the reporting engine 208 stores data identifying the API call 202 in the runtime remediation database 210. The reporting engine 208 may also store additional state information regarding the API call 202, such as data identifying the caller of the API, a call stack, data indicating how the API was called, call parameters, and other data. As will be described in greater detail below, this information may be utilized at runtime of the application 104 to enable the API call 202 to be executed.

According to one implementation, the reporting engine 208 also includes a reporting UI 212. The reporting UI 212 provides functionality for allowing a developer of the application 104 to access the contents of the runtime remediation database 210. The reporting UI 212 may also provide a UI to a developer of the application 104 for indicating that an API call 202 is not remediatable. This UI might provide details regarding the API call 202 such as the state information described above. The reporting UI 212 may also provide other types of user interfaces for providing other types of information to an author of the application 104.

Figure 3:
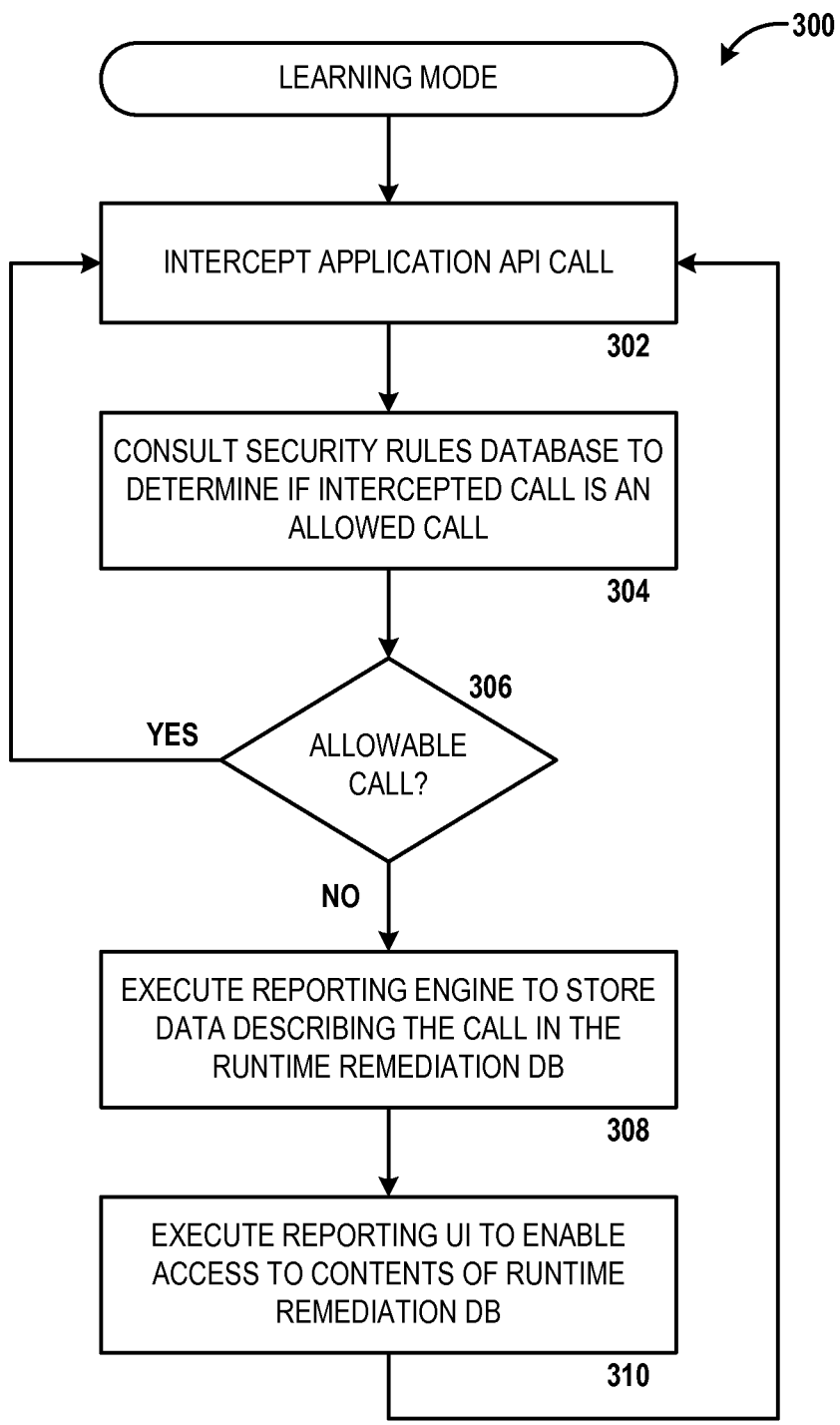
FIG. 3 is a flow diagram showing aspects of the operation of the learning mode of operation illustrated in FIG. 2, according to one embodiment presented herein.

FIG. 3 is a flow diagram showing aspects of the operation of the learning mode of operation illustrated in FIG. 2, according to one embodiment presented herein. It should be appreciated that the logical operations described herein with respect to FIG. 3 and the other FIGURES are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 300 begins at operation 302, where the reference monitor 204 intercepts the API call 202. In response thereto, the reference monitor 204 consults the security rules database 206 to determine if the intercepted call is an allowable call. If the API call 202 is allowable, the routine 300 proceeds to operation 302, described above where another API call 202 may be intercepted by the reference monitor 204. If the API call 202 is not allowable, the routine 300 proceeds from operation 306 to operation 308.

At operation 308, the reference monitor 204 sends data regarding the API call 202 to the reporting engine 208. As discussed above, the reporting engine 208 stores data in the runtime remediation database 210 describing the API call 202. At operation 310, the reporting UI 212 is executed in order to enable access to the contents of the runtime remediation database 210 to an author of the application 104. From operation 310, the routine 300 proceeds to operation 302 described above.

It should be appreciated that the learning mode of operation illustrated in FIGS. 2 and 3 and described above utilizes a security rules database 206 in order to determine whether API calls made by the application 104 are allowable within a restricted application execution environment 100. It should be appreciated, however, that other types of static analyses might be performed on the application 104 in order to determine whether the API calls made by the application 104 are allowable within the environment 100.

Figure 4:
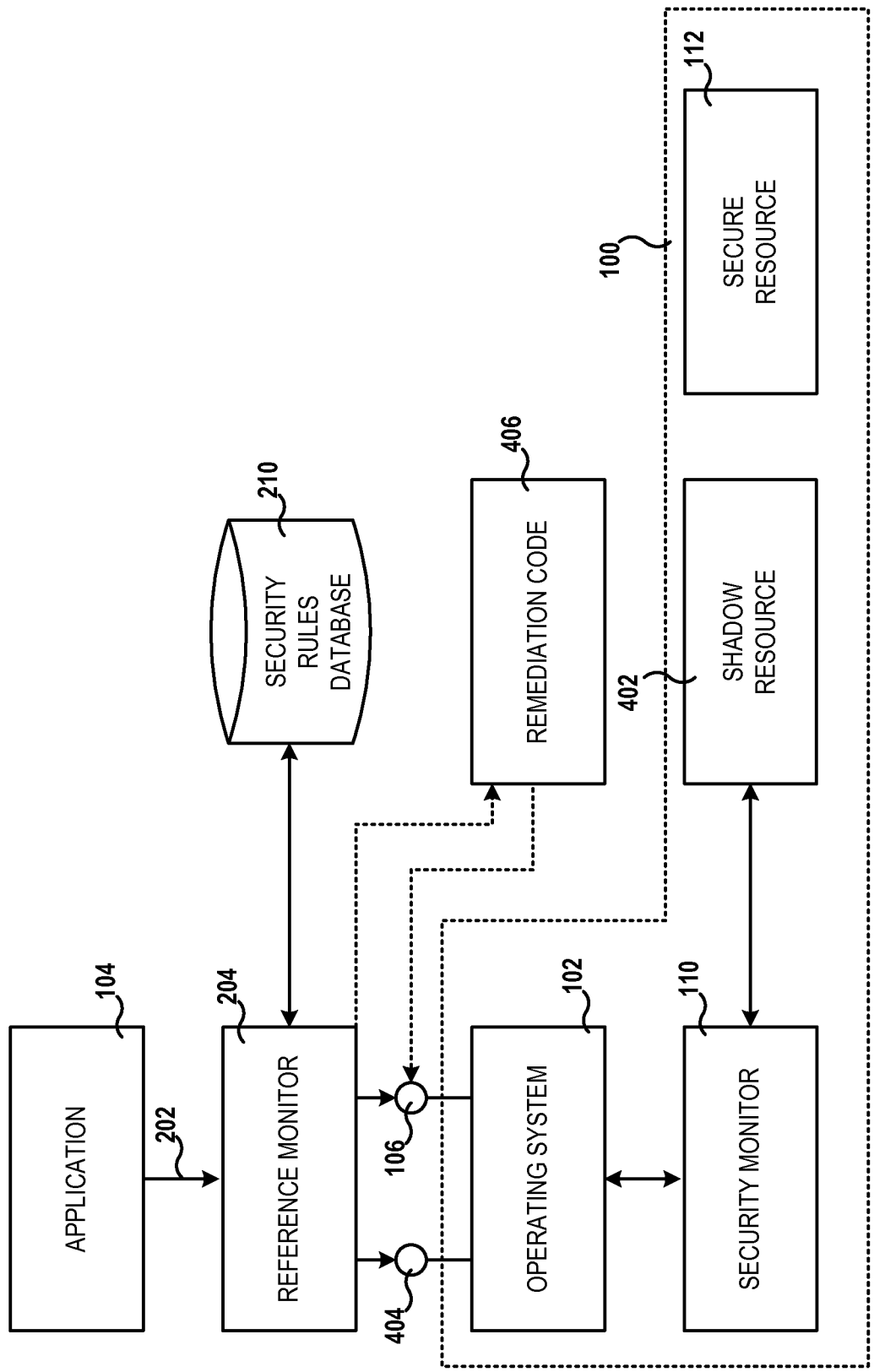
FIG. 4 is a software architecture diagram showing aspects of a mechanism disclosed herein for executing an application in a restricted application execution environment, according to one embodiment disclosed herein.

FIG. 4 is a software architecture diagram showing aspects of a mechanism disclosed herein for executing an application in a restricted application environment, according to one embodiment disclosed herein. In particular, FIG. 4 illustrates a runtime of the application 104. At runtime, the application 104 may make an API call 202. As in the learning mode, the reference monitor 204 intercepts the API call 202. At runtime, however, the reference monitor 204 consults the runtime remediation database 210 to determine if the API call 202 is allowed by the restricted application execution environment 100.

As discussed above, the runtime remediation database 210 contains data in one embodiment identifying those API calls 202 that are remediatable. If an API call is not identified within the runtime remediation database 210, the reference monitor 204 may conclude that the API call 202 is allowable without modification and allow the API call 202 to proceed. If the reference monitor 204 determines that the API call 202 is blocked by the restricted application execution environment 100, the reference monitor 204 is configured in one embodiment to modify the API call 202 so that the API call 202 can be executed within the restricted application execution environment.

In one embodiment, the reference monitor 204 virtualizes the API call 202 in order to allow the API call 202 to be executed within the environment 100. For instance, when the API call 202 is a request to access a secure resource 112, the reference monitor 204 may create shadow resource 402. The shadow resource 402 is a version of the secure resource 112 that is accessible to the API call 202 within the environment 100. Once the shadow resource 402 has been created, the reference monitor 204 may modify the API call 202 so that it is executed against the shadow resource 402. In this manner, an API call 202, such as to an API 404, may be modified to execute within the restricted application environment 100.

According to another implementation, remediation code 406 may be executed to reformat the API call 202 or perform other functions so that the API call 202 is permitted to execute within the restricted application execution environment 100. For example, the API call 202 may be to an API 404 that requires that a secure network connection be utilized. If the call 202 is formatted for use with an insecure network connection, the remediation code 406 may reformat the call 202 so that it utilizes a secure network connection. The remediation code 406 may then cause the reformatted API call to the API 404 to be executed within the environment 100. It should be appreciated that the reference monitor 204 may perform other types of functionality for modifying, reformatting, or otherwise changing the API call 202 so that the API call is allowable within the restricted application execution environment 100.

Figure 5:
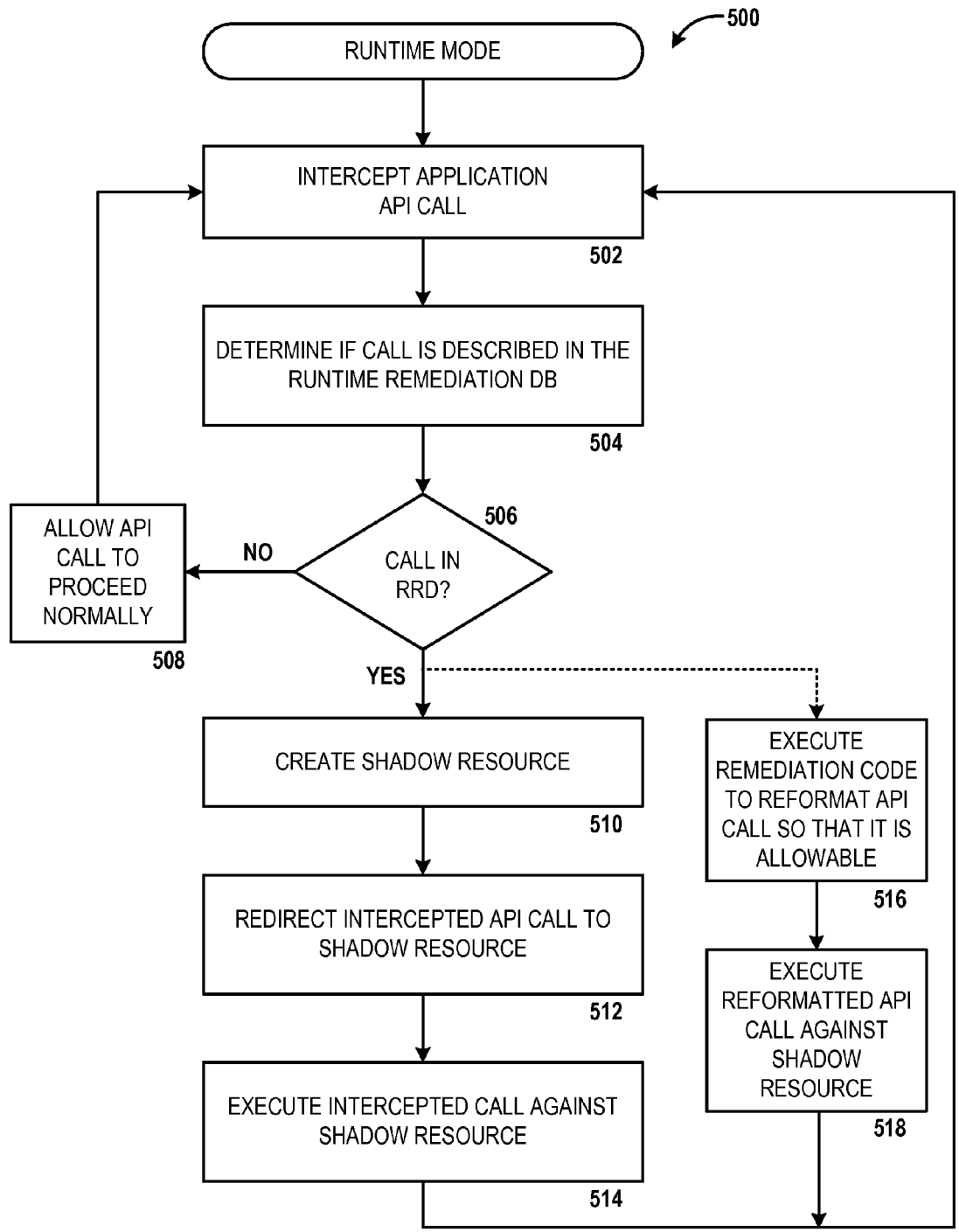
FIG. 5 is a flow diagram showing aspects of one illustrative process disclosed herein for executing an application in a restricted application execution environment, according to one embodiment presented herein.

FIG. 5 is a flow diagram showing aspects of one illustrative process disclosed herein for executing an application in a restricted application execution environment 100, according to one embodiment presented herein. In particular, FIG. 5 shows a routine 500 illustrating operations performed in the runtime mode of operation shown in FIG. 4 and described above. The routine 500 begins at operation 502 where the reference monitor 204 intercepts the API call 202. In response thereto, the reference monitor 204 consults the runtime remediation database 210 to determine if the API call 202 is identified therein.

At operation 506, the reference monitor 204 determines whether the API call 202 is identified in the runtime remediation database 210. If not, the routine 500 proceeds from operation 506 to operation 508 where the reference monitor 204 allows the API call 202 to proceed normally. For instance, if the API call 202 is to an API 404 exposed by the operating system 102, the reference monitor 204 may allow API call 202 to the API 404 to be performed.

If, at operation 506, the reference monitor 204 determines that the call 202 is identified in the runtime remediation database 210, the routine 500 proceeds from operation 506 to either operation 510 or operation 516. Operations 510-514 are for virtualizing a secure resource 112 identified by the API call 202. Operations 516-518 are for executing remediation code 406 for modifying the API call 202 so that it is allowable. Each of these operations are described in greater detail below. It should be appreciated that the operations for virtualizing the secure resource 112 and for executing the remediation code 406 may be performed alternately. In another embodiment, operations for virtualizing the secure resource 112 and for executing the remediation code 406 may be performing in conjunction with one another. As also discussed above, other types of operations may be performed in order to allow the API call 202 to be modified so that it can be performed within the environment 100.

In order to virtualize the secure resource 112, a shadow resource 402 is created at operation 510. As discussed briefly above, the shadow resource 402 is a copy of the secure resource 112 that is accessible by the API call 202 within the environment 100. Once the shadow resource 402 has been created at operation 510, the routine 500 proceeds to 512 where the reference monitor 204 causes the API call 202 to be redirected to the shadow resource 402. The API call 202 is then executed against the shadow resource 402 at operation 514. From operation 514, the routine 500 proceeds to operation 502, described above, where additional API calls may be intercepted and processed in the manner described above.

In order to execute the remediation code 406, the routine 500 proceeds from operation 506 to operation 516 where the reference monitor 204 causes the remediation code 406 to be executed. As discussed above, the remediation code 406 reformats the API call 202 so that it is allowed to execute within the environment 100. Once the API call 202 has been reformatted, the routine 500 proceeds to operation 518 where the remediation code 406 causes the reformatted API call 202 to be executed against the secure resource 112. From operation 518, the routine 500 proceeds to operation 502 where additional API calls are intercepted and processed in the manner described above.

It should be appreciated that, according to other implementations, aspects of the technologies described herein may be provided as a service. For instance, in one implementation, a vendor may provide the runtime remediation database 210 and the security rules database 206. The vendor might also process requests to execute an application in the learning mode described above. In response thereto, the vendor might provide a security rules database 206 customized for the application. In this manner, a customer of the service may be freed from having to perform the learning mode operations.

Figure 6:
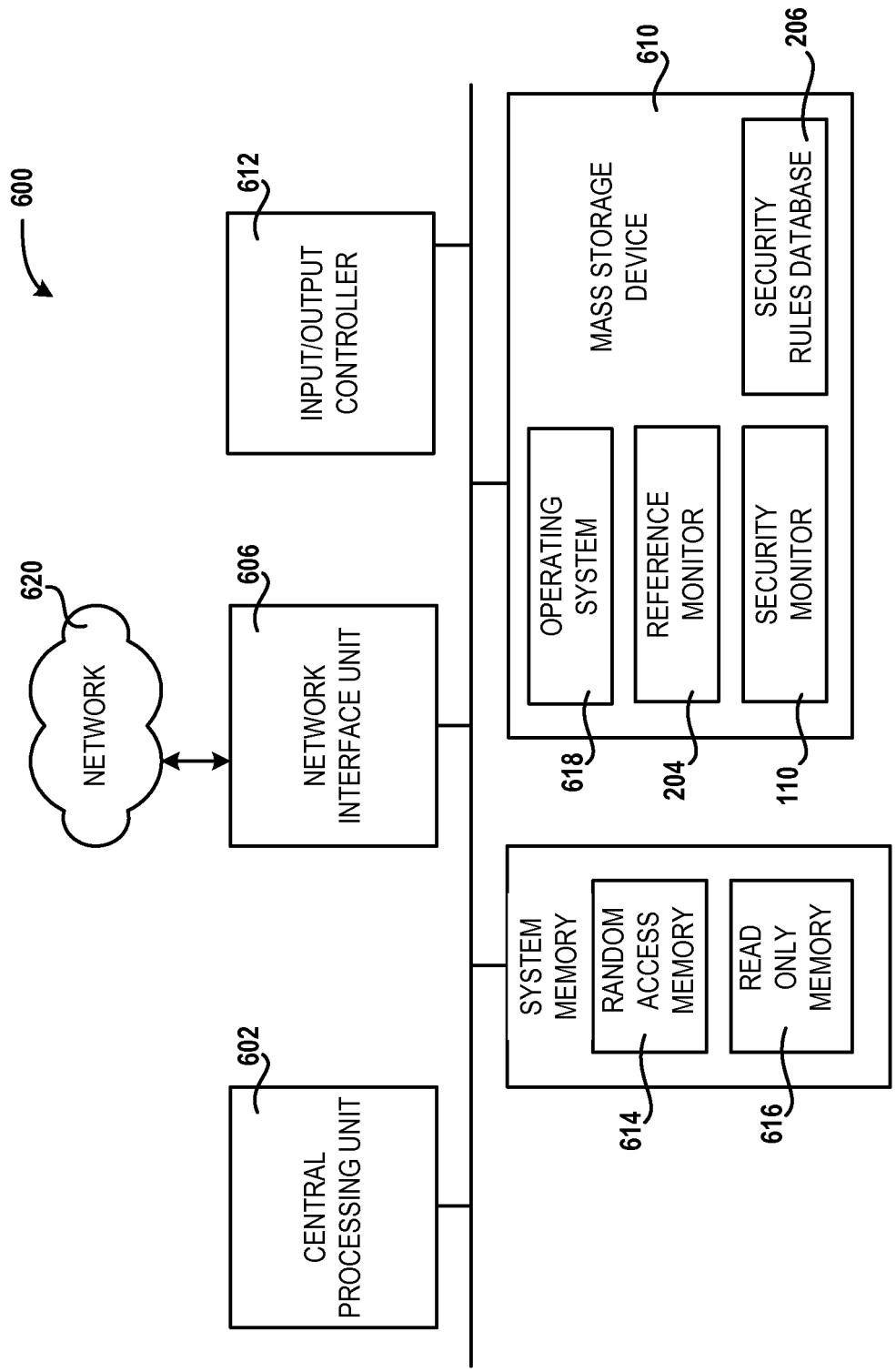
FIG. 6 is a computer architecture diagram showing an illustrative computer hardware and software architecture for a computing system capable of implementing the various embodiments presented herein.

FIG. 6 is a computer architecture diagram showing an illustrative computer hardware and software architecture for a computing system capable of implementing the various embodiments presented herein. The computer architecture shown in FIG. 6 illustrates a conventional desktop, laptop computer, or server computer and may be utilized to execute the various software components described herein.

The computer architecture shown in FIG. 6 includes a central processing unit 602 ("CPU"), a system memory 608, including a random access memory 614 ("RAM") and a read-only memory ("ROM") 616, and a system bus 604 that couples the memory to the CPU 602. A basic input/output system ("BIOS") containing the basic routines that help to transfer information between elements within the computer 600, such as during startup, is stored in the ROM 616. The computer 600 further includes a mass storage device 610 for storing an operating system 618, application programs, and other program modules, which will be described in greater detail below.

The mass storage device 610 is connected to the CPU 602 through a mass storage controller (not shown) connected to the bus 604. The mass storage device 610 and its associated computer-readable storage media provide non-volatile storage for the computer 600. Although the description of computer-readable media contained herein refers to a mass storage device, such as a hard disk or CD-ROM drive, it should be appreciated by those skilled in the art that computer-readable storage media can be any available computer storage media that can be accessed by the computer 600.

By way of example, and not limitation, computer-readable storage media may include volatile and non-volatile, removable and non-removable media implemented in any method or technology for storage of information such as computer-readable instructions, data structures, program modules or other data. For example, computer-readable storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other non-transitory medium which can be used to store the desired information and which can be accessed by the computer 600.

It should be appreciated that the computer-readable media disclosed herein also encompasses communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media. Computer-readable storage media does not encompass communication media.

According to various embodiments, the computer 600 may operate in a networked environment using logical connections to remote computers through a network such as the network 620. The computer 600 may connect to the network 620 through a network interface unit 606 connected to the bus 604. It should be appreciated that the network interface unit 606 may also be utilized to connect to other types of networks and remote computer systems. The computer 600 may also include an input/output controller 612 for receiving and processing input from a number of other devices, including a keyboard, mouse, or electronic stylus (not shown in FIG. 6). Similarly, an input/output controller may provide output to a display screen, a printer, or other type of output device (also not shown in FIG. 6).

As mentioned briefly above, a number of program modules and data files may be stored in the mass storage device 610 and RAM 614 of the computer 600, including an operating system 618 suitable for controlling the operation of a networked desktop, laptop, or server computer. The mass storage device 610 and RAM 614 may also store one or more program modules. In particular, the mass storage device 610 and the RAM 614 may store the reference monitor 204, the security monitor 110, the reporting engine 208, and/or the other software components described above. The mass storage device 610 and RAM 614 may also store other program modules and data, such as the security rules database 206 and the runtime remediation database 210.

In general, software applications or modules may, when loaded into the CPU 602 and executed, transform the CPU 602 and the overall computer 600 from a general-purpose computing system into a special-purpose computing system customized to perform the functionality presented herein. The CPU 602 may be constructed from any number of transistors or other discrete circuit elements, which may individually or collectively assume any number of states. More specifically, the CPU 602 may operate as one or more finite-state machines, in response to executable instructions contained within the software or modules. These computer-executable instructions may transform the CPU 602 by specifying how the CPU 602 transitions between states, thereby physically transforming the transistors or other discrete hardware elements constituting the CPU 602.

Encoding the software or modules onto a mass storage device may also transform the physical structure of the mass storage device or associated computer readable storage media. The specific transformation of physical structure may depend on various factors, in different implementations of this description. Examples of such factors may include, but are not limited to: the technology used to implement the computer readable storage media, whether the computer readable storage media are characterized as primary or secondary storage, and the like. For example, if the computer readable storage media is implemented as semiconductor-based memory, the software or modules may transform the physical state of the semiconductor memory, when the software is encoded therein. For example, the software may transform the states of transistors, capacitors, or other discrete circuit elements constituting the semiconductor memory.

As another example, the computer readable storage media may be implemented using magnetic or optical technology. In such implementations, the software or modules may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope and spirit of the present description, with the foregoing examples provided only to facilitate this discussion.

Based on the foregoing, it should be appreciated that technologies for executing an application in a restricted application execution environment have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method comprising performing computer-implemented operations for:
    intercepting an application programming interface (API) call made by an application external to a restricted application execution environment before the API call is to be executed within the restricted application execution environment;
    determining if the intercepted API call is blocked by the restricted application execution environment;
    in response to determining that the intercepted API call is blocked by the restricted application execution environment, modifying the blocked API call before the API call is executed within the restricted application execution environment; and
    executing the modified API call within the restricted application execution environment.

2. The computer-implemented method of claim 1, wherein the API call is directed toward a secure resource, and wherein modifying the blocked API call before the API call is executed within the restricted application execution environment further comprises:
    creating a shadow resource within the restricted application execution environment; and
    causing the modified API call to be executed against the shadow resource within the restricted application execution environment.

3. The computer-implemented method of claim 2, wherein the shadow resource comprises a version of the secure resource that is accessible to the modified API call within the restricted application execution environment.

4. The computer-implemented method of claim 1, wherein modifying the blocked API call before the API is executed within the restricted application execution environment further comprises:
    executing remediation code to reformat the blocked API call before it is executed within the restricted application execution environment; and
    executing the reformatted API call within the restricted application execution environment.

5. The computer-implemented method of claim 1, wherein determining if the intercepted API call is blocked by the restricted application execution environment further comprises determining whether the API call is described in a runtime remediation database.

6. The computer-implemented method of claim 5, wherein the runtime remediation database comprises a database storing data identifying API calls that are blocked by the restricted application execution environment.

7. The computer-implemented method of claim 6, wherein the runtime remediation database is generated by:
    intercepting API calls made by the external application before the API calls are to be executed within the restricted application execution environment;
    determining whether the API calls made by the external application are blocked from execution within the restricted application execution environment; and
    for each API call blocked from execution within the restricted application execution environment, storing data in the runtime remediation database that identifies the blocked API call.

8. The computer-implemented method of claim 7, wherein determining whether the API calls made by the external application are blocked from execution within the restricted application execution environment comprises determining whether the API call is identified in a security rules database.

9. The computer-implemented method of claim 8, wherein the security rules database comprises a database storing data indicating whether API calls are allowed to execute within the restricted application execution environment.

10. The computer-implemented method of claim 6, wherein the runtime remediation database is generated by performing a static analysis on the external application to identify API calls that are blocked from execution within the restricted application execution environment.

11. The computer-implemented method of claim 1, wherein the restricted application execution environment comprises an operating system that restricts the use of legacy APIs.

12. A computer-readable storage medium having computer-executable instructions stored thereupon which, when executed by a computer, cause the computer to:
    intercept an application programming interface (API) call made by an application external to a restricted application execution environment before the API call is to be executed within the restricted application execution environment;
    determine if the intercepted API call is blocked by the restricted application execution environment;
    in response to determining that the API call is blocked by the restricted application execution environment,
        modify the blocked API call before the API call is executed within the restricted application execution environment; and to
        cause the modified API call to be executed within the restricted application execution environment.

13. The computer-readable storage medium of claim 12, wherein the API call is directed toward a secure resource, and wherein modifying the blocked API call before the API call is executed within the restricted application execution environment further comprises creating a shadow resource within the restricted application execution environment.

14. The computer-readable storage medium of claim 13, wherein the shadow resource comprises a version of the secure resource that is accessible to the modified API call within the restricted application execution environment.

15. The computer-readable storage medium of claim 12, wherein modifying the blocked API call before the API call is executed within the restricted application execution environment further comprises executing remediation code to reformat the blocked API call before the blocked API call is executed within the restricted application execution environment.

16. The computer-readable storage medium of claim 12, wherein determining if the intercepted API call is blocked for execution within the restricted application execution environment further comprises determining whether the API call is described in a database that stores data identifying API calls that are blocked from execution within the restricted application execution environment.

17. The computer-readable storage medium of claim 16, wherein the database is generated by:
    intercepting API calls made by the external application before the API calls are to be executed within the restricted application execution environment;
    determining whether the API calls made by the external application are blocked from execution within the restricted application execution environment; and
    for each API call blocked from execution within the restricted application execution environment, storing data in the database that identifies the blocked API call.

18. A computer-readable storage medium having computer-executable instructions stored thereupon which, when executed by a computer, cause the computer to:
    provide a learning mode of operation in which application programming interface (API) calls made by an application external to a restricted application execution environment are intercepted before the API calls are executed within the restricted application execution environment and in which data is stored in a database for each intercepted API call that is blocked by the restricted application execution environment; and
    at a runtime of the external application,
        to intercept an API call made by the external application before the API call is to be executed within the restricted application execution environment,
        to utilize the database to determine if the intercepted API call is blocked by the restricted application execution environment,
        in response to determining that the intercepted API call is blocked by the restricted application execution environment,
            to modify the blocked API call before it is executed within the restricted application execution environment, and
            to cause the modified API call to be executed within the restricted application execution environment.

19. The computer-readable storage medium of claim 18, wherein the API call is directed toward a secure resource, and wherein modifying the blocked API call before the API call is executed within the restricted application execution environment further comprises:
    creating a shadow resource comprising a version of the secure resource that is accessible to the modified API call within the restricted application execution environment; and
    causing the modified API call to be executed against the shadow resource.

20. The computer-readable storage medium of claim 18, wherein modifying the blocked API call before the API call is executed within the restricted application execution environment further comprises:

executing remediation code to reformat the blocked API call for execution within the restricted application execution environment; and
executing the reformatted API call.

* * * * *